Nov. 29, 1966 R. DELACOUX 3,288,626
SCINTILLATORS FOR COUNTING-PARTICLES
Filed Dec. 18, 1962
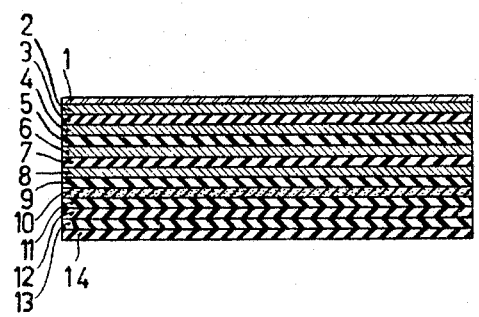
INVENTOR.
RENE' DELACOUX
BY
AGENT

United States Patent Office 3,288,626
Patented Nov. 29, 1966

3,288,626
SCINTILLATORS FOR COUNTING-PARTICLES
René Delacoux, Nanterre, France, assignor to North American Philips Company, Inc., New York, N.Y., a corporation of Delaware
Filed Dec. 18, 1962, Ser. No. 245,549
Claims priority, application France, Dec. 18, 1961, 882,253, 882,254
8 Claims. (Cl. 117—33.5)

This invention relates to a scintillator for counting α-particles comprising an inorganic powder as the fluorescent substance. Such a fluorescent substance emits light under the influence of α-particles.

It is known to use for this purpose as inorganic powders suitably activated zinc sulphide, cadmium sulphide, calcium tungstenate, sodium iodide, cesium iodide, potassium iodide and certain fluorides. Usually, copper- or silver-activated zinc sulphide or cadium sulphide is used. The fluorescent substance is available in a binder, for example nitrocellulose, in a thin layer on a transparent carrier. Of course, the carrier must be transparent in order to observe the light emitted under the influence of the α-particles. Usually, the photons emitted are recorded by a detector, for example a photomultiplier. The carrier is then mounted on the window of the photomultiplier. Although the carrier is transparent, the number of photons recorded by the detector will nevertheless be smaller than the number of photons emitted by the fluorescent substance.

It is an object of the invention to provide a scintillator in which these numbers are substantially equal.

According to the invention, the scintillator has a thickness in the order of 10 microns, consists of a plastic binder and contains the fluorescent substance in a surface layer. This scintillator has the additional advantage that it can readily be handled and be provided in a simple manner on the detector, in particular the window of the photomultiplier. The fluorescent substance is located in a surface layer of the film, because if the fluorescent substance were distributed homogeneously in the film, only part of the fluorescent substance would be struck by the α-particles, and also because the presence of the particles of the fluorescent substance would give rise to loss of light due to absorption. In addition, in case of a larger thickness of the fluorescent substance, which would be the result of a homogeneous distribution in the whole film, the possibility would exist that also under the influence of other rays, for example, β-, γ- and cosmic rays, light would be emitted. The surface layer containing the fluorescent substance cannot be used as such as a scintillator, since it is too thin and consequently too fragile. Since the α-particles enter the film-shaped scintillator on the side where the fluorescent substance is located and the light produced leaves the scintillator on the other side, the thickness of the scintillator is determined to the extent to which the plastic binder is translucent. This binder also protects the fluorescent substance from being influenced by the ambient atmosphere.

If the scintillator is used in the presence of light, for example daylight, it is of importance that the light emitted by the fluorescent substance be distinguished from the ambient light. In addition, the sensitivity of the detector usually is such that it may not be exposed to daylight from which it must be screened. For this purpose, the film contains on the side of the surface layer which comprises the fluorescent substance at least one layer of a substance which does pass α-particles and does not pass light, for example a metal layer. The light which leaves the scintillator on the other side then originates exclusively from particles of the fluorescent substance which have been caused to emit light by the α-particles. Preferably, an aluminum layer is used for the thin metal layer and preferably more than one layer is available because a metal layer never is so ideal that no pores are present in it. If several metal layers are present, the possibility of the pores being located exactly opposite one another is very small. In particular, the layers of this substance are separated from one another by coating layers, because in that case, the possibility is greater than the pores are not located opposite to one another. The ideal impermeability to light is achieved better in this manner than with a thick layer.

In connection with the provision of these various layers, the coating layer preferably is soluble on one side in a solvent in which the coating layer on the other side is not soluble. As a result of this, a solvent which penetrates through possible pores into the opaque layer is prevented from, locally dissolving the underlying coating layer when the coating is applied. For this purpose, polyvinylalcohol which is water-soluble and chloroform-insoluble and polyvinyl formal which is chloroform-soluble and water-insoluble may be used. The coating layer also protects the metal layers from being influenced by the ambient atmosphere.

In addition, the invention relates to a method of manufacturing such scintillators. For this purpose, a syrupy liquid consisting of a translucent plastic binder and a suitable solvent which contains the powdered fluorescent material in suspension, is provided on a carrier and the solvent is evaporated and then at least once a syrupy liquid is provided on it consisting of a translucent plastic binder and a suitable solvent, after which the solvent is evaporated. The first syrupy liquid is provided on a flat horizontal carrier, for example glass. As a plastic material, for example, nitrocellulose is used. In order to obtain a satisfactory coherence between the various layers and a ready homogeneity of the assembly, preferably the same plastic material is always used. The resulting film is detached from the carrier. This may be carried out in water or while dry depending upon the thickness and the strength of the resulting film. It may be used separately or it may be provided on another carrier. No requirements need be imposed upon this carrier with reference to the solvent which is used when the plastic binder is provided. In this case, the carrier is advantageously built up in the form of a light conductor which is suitable for conveying the photons emitted to the detector, for example the window of the photomultiplier.

In order to render the scintillator suitable, if required, for use in well-lighted surroundings, and to protect the detector from the ambient light, the resulting film is provided on a carrier with the side remote from the fluorescent substance. Then at least one plastic coating layer and a layer of a substance which does pass α-particles and does not pass light are provided. Finally this is covered with a protective layer. The flat horizontal carrier may, for example, also consist of glass. A thin metal layer which does pass α-particles and does not pass light, may be obtained in known manner by metallizing in a vacuum. The plastic coating layer may be obtained by providing a syrupy liquid and causing this to dry. This layer fills possible pores in the underlying metal layer. The protective final layer consists, for example, of a suitable plastic or varnish. The scintillator obtained in this manner may either be left on the carrier, which in this case may advantageously be built up in the form of a light conductor, or may be detached from the carrier, in water or while dry. If desired, the film may be mounted on a different carrier, for which also no requirements need be imposed with reference to the solvents used when providing the coating layers.

The invention will be described with reference to the drawing which shows the structure of a scintillator the component parts of which are not drawn to the same scale.

Referring to the drawing, the layer 10 consists of nitrocellulose and contains copper-activated zinc sulphide. On one side are located the layers 11, 12, 13 and 14 consisting of nitrocellulose which cannot be distinguished separately in the finished product, but which have been provided successively during the manufacture. The layers 10, 11, 12, 13 and 14 together form a scintillator which may be used separately and which mechanically has a sufficient rigidity. On the other side of the layer 10 are located the aluminum layers 2, 4, 6 and 8 and the plastic layers 3, 5, 7 and 9. The layers 3 and 7 consist of polyvinylalcohol and the layers 5 and 9 of polyvinylformal. The varnish layer 1 is provided on top. The thickness of the assembly is approximately 10 microns. The scintillator is exposed on its top side of the incident radiation, including visible radiation. This incident light is stopped by the aluminum layers 2, 4, 6 and 8. Incident α-particles cause the zinc sulphite grains to emit light which leaves the scintillator at the lower side and is recorded in a detector not shown.

What is claimed is:

1. A scintillator for counting α-particles comprising a body of synthetic plastic material having a thickness of the order of 10 microns containing an inorganic fluorescent powder which emits visible light when bombarded with α-particles in a surface layer thereof.

2. A scintillator for counting α-particles comprising a body of synthetic plastic material having a thickness of the order of 10 microns containing an inorganic fluorescent powder, which emits visible light when bombarded with α-particles in a surface layer thereof, and a light-impervious α-particle permeable metal layer covering said surface layer of said body.

3. A scintillator for counting α-particles comprising a body of synthetic plastic material having a thickness of the order of 10 microns containing an inorganic fluorescent powder which emits visible light when bombarded with α-particles in a surface layer thereof, and a plurality of light-impervious, α-particles permeable metal layers separated by layers of synthetic plastic material in contact with and covering said surface layer of said body.

4. A scintillator for counting α-particles comprising a body of synthetic plastic material having a thickness of the order of 10 microns containing an inorganic fluorescent powder which emits visible light when bombarded with α-particles in a surface layer thereof, a plurality of light-impervious, α-particles permeable metal layers separated by layers of synthetic plastic material covering said surface of said body, alternate layers of the synthetic plastic material being water-soluble and chloroform soluble respectively, and an organic resin layer covering the outermost metal layer.

5. A scintillator for counting α-particles as claimed in claim 1 in which the body of synthetic plastic material is nitrocellulose.

6. A scintillator for counting α-particles as claimed in claim 5 in which the fluorescent powder is copper activated zinc sulphide.

7. A scintillator for counting α-particles as claimed in claim 4 in which the metal layers pervious to α-particles and impervious to light are aluminum.

8. A scintillator as claimed in claim 7 in which the alternate layers of synthetic plastic material are polyvinylalcohol and polyvinylformal.

References Cited by the Examiner

UNITED STATES PATENTS

| | | | |
|---|---|---|---|
| 2,694,153 | 11/1954 | Reuter | 117—33.5 |
| 2,733,216 | 1/1956 | Eichholz et al. | 252—301.2 |
| 2,742,376 | 4/1956 | Larach | 117—33.5 |
| 2,961,541 | 11/1960 | Ruderman | 250—83.3 |
| 3,005,103 | 10/1961 | Hinson | 250—80 |
| 3,011,919 | 12/1961 | Niklas | 117—33.5 |
| 3,041,287 | 6/1962 | Hyman | 252—301.2 |
| 3,114,834 | 12/1963 | Thompson | 250—71.5 |
| 3,163,765 | 12/1964 | Niklas | 250—71.5 |

WILLIAM D. MARTIN, *Primary Examiner.*

S. W. ROTHSTEIN, *Assistant Examiner.*